United States Patent [19]

Nagayama

[11] 4,383,044

[45] May 10, 1983

[54] SLAKING-RESISTANT CALCIA REFRACTORY

[75] Inventor: Hiroshi Nagayama, Katsuta, Japan

[73] Assignee: Hitachi, Ltd., Tokyo, Japan

[21] Appl. No.: 311,181

[22] Filed: Oct. 14, 1981

[30] Foreign Application Priority Data

Oct. 14, 1980 [JP] Japan .................................. 55-142379
Mar. 13, 1981 [JP] Japan .................................. 56-35196

[51] Int. Cl.$^3$ .............................................. C04B 35/04
[52] U.S. Cl. .................................. 501/108; 501/112; 501/118; 501/122; 501/123; 501/125
[58] Field of Search ............... 501/112, 118, 122, 125, 501/123, 108

[56] References Cited

U.S. PATENT DOCUMENTS 2,916,389 12/1959 McAllister .......................... 501/123
3,060,042 10/1962 Leatham et al. .................... 501/123

*Primary Examiner*—James Poer
*Attorney, Agent, or Firm*—Antonelli, Terry & Wands

[57] ABSTRACT

Provided by this invention is a slaking-resistant calcia refractory comprising, as a fired mixture, (a) 2% by weight or less of silicon dioxide, (b) aluminum oxide ($Al_2O_3$) and magnesium oxide (MgO) of the amount defined in the graph of FIG. 5 as within the region enclosed by the lines connecting point A (2.5 wt % $Al_2O_3$ and 0 wt % MgO), point B (1.5 wt % $Al_2O_3$ and 1.5 wt % MgO), point C (1.5 wt % $Al_2O_3$ and 8.5 wt % MgO) and point D (10 wt % $Al_2O_3$ and 0 wt % MgO), (c) 0.9% by weight or less of iron oxide, and (d) a predominant amount of calcium oxide.

20 Claims, 28 Drawing Figures

SLAKING-RESISTANT CALCIA REFRACTORY

BACKGROUND OF THE INVENTION (1) Field of the Invention

This invention relates to a novel calcia refractory, especially to an improved slaking-resistant calcia refractory which is best suited for use as material of basic refractory brick.

(2) Description of the Prior Art

Heretofore, magnesia, magnesia chromia and magnesia-alumina basic refractories have been popularly used as lining material for steel-making furnaces such as electric furnaces and converters, rotary cement kilns, etc., but because of the problems with these refractories such as voluminous energy consumption in the production process or possible environmental pollution due to use of chromia, changing from these refractories to calcia refractory has now become a matter of great concern. Because of its high slaking resistance, calcia has been noticed with great interest for its utilization as refractory material and attempts are being made to lower the firing temperature of this material from the viewpoint of energy saving.

As prior art for development of slaking-resistant calcia refractory, U.S. Pat. No. 2,916,389 discloses a method in which iron oxide is blended as slaking inhibitor, in an amount of 1–10% by weight, 1% by weight or less of silicon dioxide and 2–5% by weight of magnesium oxide and the blend is fired at a relatively low temperature, that is, 1,427°–1,649° C. However, further studies by this inventor revealed the fact that while blending of iron oxide is effective for promoting sintering and slaking resistance of the calcia refractory, it involves the possibility to reduce thermal shock resistance and hot strength of the refractory due to formation of low-melting matrices such as $3(Ca,Fe)O \cdot (Fe, Al)_2O_3 \cdot 3SiO_2$ and dicalcium ferrite ($2CaO \cdot Fe_2O_3$), so that it is desirable to confine the iron oxide content in the blend to the lowest possible level. It was also disclosed that when such iron oxide-containing calcia refractory is used for the parts contacting the molten steel, for example, bricks for ladle for making ingots or electric furnace hearth, there results greater wettability with the molten steel than the refractory not containing iron oxide, and also the specific gravity of the particles tends to increase, so that when these particles are mixed in the molten steel, they become more reluctant to float up and separate than the particles not containing iron oxide and tend to become inclusions in the oxide system. So, the inventors have conducted more minute studies on the relationship between the iron oxide content which exerts an influence on slaking resistance of calcia refractory and the contents of silicon dioxide, aluminum oxide and magnesium oxide. As a result, the fact was disclosed that the slaking resistance is reduced as the iron oxide content decreases, and in the case of the refractory preparations after firing at 1,400° C. in which the iron oxide content was less than 0.45% by weight, their percent slaking retention after one-hour dealing in an autoclave after 5 atm. was excessively lessened, and particularly in the refractories containing no iron oxide after firing at 1,400° C., the percent slaking retention in the autoclave was zero. It was noted, however, that the refractories fired at 1,500° C. showed a very high percent slaking retention if the iron oxide content is properly adjusted.

In case such blend is fired in a rotary kiln or such, the firing efficiency is excessively lowered if the blend is fired in the form of powder, excepting the case where firing is performed by fluidized roasting, so that usually the powder is once shaped into pellets and then charged into the kiln for firing. However, this method still has some serious problems. The pellets maintain fairly high strength owing to the caking action of moisture before they are charged into the kiln, but when treated in the kiln, they are broken and pulverized in the course of drying and firing under mechanical impact in the kiln, resulting not only in a reduced yield of the fired grains but also heavy deposit of the pulverized particles on the furnace wall to cause ring trouble, or diminished furnace volume. In order to keep off such trouble, there is necessitated a caking agent that can give sufficient strength to the pellets in the temperature range used till formation of ceramic bonds in the firing process. The results of various studies on the organic and inorganic solid and liquid caking agents showed that the organic binders are detrimental to compaction of the clinker particles because such caking agents are scattered away during firing. Also, many of the inorganic caking agents lowered slaking resistance as they prevented the clinker particles from becoming compact or inhibited growth of the CaO crystal grains. Water may be used as an inorganic liquid caking agent but is not satisfactory. Calcia clinker not containing iron oxide is intolerably low in slaking resistance when the firing temperature is below 1,500° C. This is attributable to a fairly wide variation of eutectic temperature of $CaO-Al_2O_3-SiO_2$ or $CaO-Al_2O_3-MgO-SiO_2$ system, depending on whether $Fe_2O_3$ is present or absent. Therefore, in case of refractory blends not containing iron oxide, it is quite difficult to effect sintering at such low temperature as used in the above-mentioned method by merely adjusting the contents of the blended materials such as $Al_2O_3$ and MgO.

SUMMARY OF THE INVENTION (1) Object of the Invention

An object of this invention is to provide a calcia refractory with excellent slaking resistance.

Another object of this invention is to provide a calcia refractory with improved low-temperature sinterability and firing yield.

(2) Statement of the Invention

Figure 5:
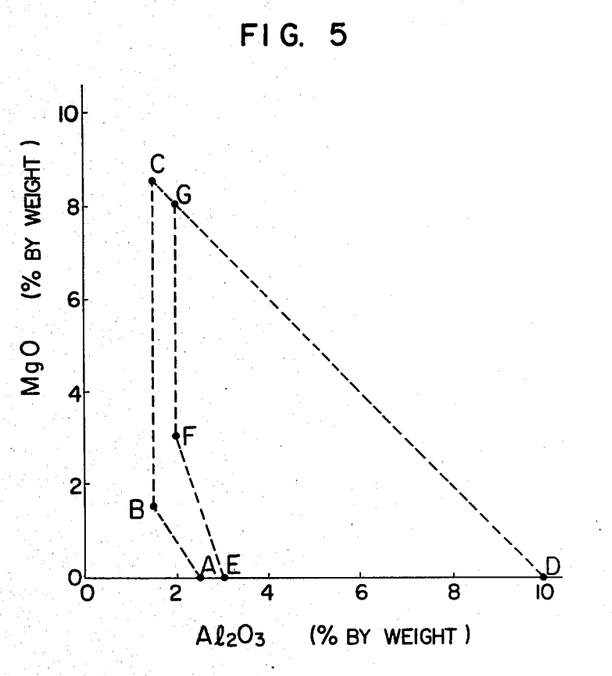
FIG. 5 is a diagram showing the range of $Al_2O_3$ and MgO contents in calcia refractories in accordance with this invention.

This invention provides a slaking-resistant calcia refractory comprising a fired mixture of (a) 2% by weight or less of silicon dioxide, (b) aluminum oxide ($Al_2O_3$) and magnesium oxide (MgO) of the amount in the range defined in the graph of FIG. 5 by connecting point A ($Al_2O_3$:2.5 by weight; MgO:0% by weight), point B ($Al_2O_3$:1.5% by weight; MgO:1.5% by weight), point C ($Al_2O_3$:1.5% by weight; MgO:8.5% by weight) and point D ($Al_2O_3$:10% by weight; MgO:0% by weight), (c) 0.9% by weight or less of iron oxide, and (d) a predominant amount of calcium oxide.

The calcia refractory in accordance with this invention can be obtained by blending the above-mentioned materials (a)–(d) in the specified ratios and then firing the blend at a temperature preferably above 1,500° C.

It was found that, according to the present invention, even when iron oxide is present as an impurity, if it is 0.9% by weight or less, especially 0.4% by weight or less, there can be obtained a a calcia refractory having desired slaking resistance by adjusting the silicon dioxide content and aluminum oxide content or the content of the mixture of aluminum oxide and magnesium oxide within the above-defined range. At least one of limestone, calcium hydroxide and calcined lime are used as calcium oxide materials in this invention.

Firing causes the reactions between the particles of the respective blended materials to form the reaction product which improves the slaking resistance.

Magnesium oxide and aluminum oxide are effective for further elevating the slaking resistance. A small quantity of magnesium oxide takes effect in lowering viscosity of the matrix around the CaO crystals while aluminum oxide promotes growth of the CaO cuptal grains by forming a low-melting matrix such as 3CaO.$Al_2O_3$ or 5CaO.3$Al_2O_3$ while also reducing the porosity to strengthen the body of the refractory.

As aluminum oxide, there may be used calcined alumina, aluminum hydroxide, corundum and the like, and as magnesium oxide, there may be used magnesium hydroxide, magnesium carbonate, calcined magnesia and the like. One should be attentive to silicon dioxide which is contained as impurity in these additives. When mullite (3$Al_2O_3$.2$SiO_2$) refractory is used as aluminum oxide material to give, for example, 3.6% by weight of aluminum oxide, then 1.5% by weight of $SiO_2$ will be added to make the total $SiO_2$ content in the whole refractory blend exceed 2% by weight. $SiO_2$ forms 2CaO.$SiO_2$ in the course of firing of the refractory and disturbs growth of the CaO crystal grains to weaken the slaking resistance of the calcia refractory. Also, 2CaO.$SiO_2$ staying between the CaO crystal grains weakens the inter-crystal binding force by $\alpha'$-$\gamma$ transition which occurs at 850° C., thus making the fired product more loose and breakable into powder. Because of these harmful effects, $SiO_2$ content in the refractory blend must be kept below 2% by weight. As for the particle size of the additives and material powder, it is desirable that the particles thereof with sizes less than 200 $\mu$m will exist in an amount of more than 80% by weight. For effecting desired material powder mixing, dry or semi-dry mixing method is unsatisfactory; it is effective to knead the slurry by a mixer or a mill such as trommel or wet pan mill. The kneadings, with its moisture content adjusted, are shaped into pellets or granules and then fired in a rotary kiln or such. For promoting the solid phase reaction to achieve a sufficient sintering effect, the material to be fired should be as small in thickness as possible and also pressed to let the particles attach closely to each other. Firing may be effected in the ordinary way. In case of using limestone system starting material, it is first perfectly calcined at 1,000°–1,300° C. and, after sufficiently removing carbon dioxide produced from decomposition of calcium carbonate, the calcined material is further heated and fired at a temperature above 1,500° C. This gives a high-quality refractory product. If the firing temperature is below 1,500° C., no sufficient reaction takes place and the growth of the CaO crystal grains is also insufficient. Generally, the higher the firing temperature, the better, but too high a temperature may cause damage to the lining refractory, so that the temperature range of from 1,500° C. to 1,700° C. is preferred.

When performing firing in a rotary kiln, the press-shaped pellets might be reduced in strength at degasification and powdered in the furnace, so that it is advised to perform shaping and firing by using an inorganic or organic caking agent in an amount range which does not impair the slaking resistance of the product.

Industrial limestone contains, if in small quantities, $Al_2O_3$, MgO, $Fe_2O_3$, $SiO_2$ and such. The limestone used in this invention should be one in which $Fe_2O_3$ content is less than 0.9% by weight, preferably less than 0.4% by weight. Thus, according to this invention, a high-purity calcia refractory can be obtained by using ordinary limestone and by adding aluminum oxide and magnesium oxide instead of iron oxide conventionally used as slaking inhibitor.

Further, the calcia refractory in accordance with this invention is characterized by containing 0.03–0.2% by weight of boron oxide, and such calcia refractory can be obtained by firing the blend at a temperature above 1,350° C.

In case boron oxide is contained, there is obtained a refractory with good sinterability and high-temperature strength especially when iron oxide is present in an amount of 0.3–0.9% by weight in the blend.

Boron oxide has the eutectic points in the neighborhood of 960° C. and 1,160° C. in relation to CaO, and this is considered conducive to low-temperature sintering of CaO. The defined amount of boron oxide added is based on the result of the analyses of the effects in co-existence of iron oxide used as slaking inhibitor and other components. In case a boron compound is contained in an amount of 0.03–0.2% by weight in terms of $B_2O_3$, the resultant effect varies depending on the ratios of $Fe_2O_3$, $Al_2O_3$, $SiO_2$, MgO and such contained in the blend. Especially, a high low-temperature sintering effect was provided when no iron oxide was contained, and there could be obtained the refractories showing a percent slaking retention over 90% after one-hour 5-atm. autoclave dealing by properly controlling the ratios of other components and firing at 1,400° C.

The calcia refractory in accordance with this invention must have calcium oxide as the main component, and in view of utilizing the high refractory characteristics of calcium oxide, the content of calium oxide must be 81% by weight, or higher, preferably 90% by weight or higher. Thus, it is preferable that there should be a predominant amount of calcium oxide in the above-mentioned composition of silicon dioxide, aluminum oxide, magnesium oxide and iron oxide.

PREFERRED EMBODIMENTS OF THE INVENTION

Experimental Example 1

Figure 1:
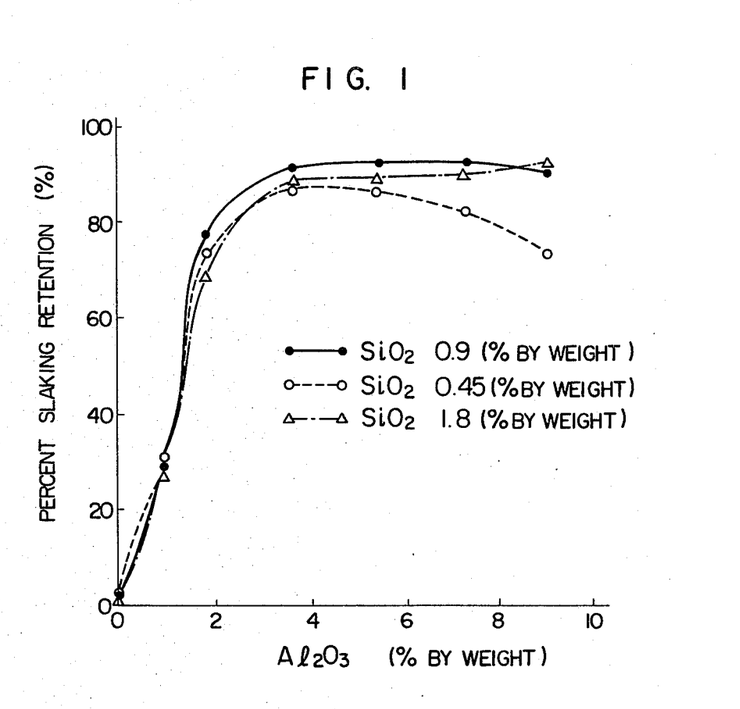
FIG. 1 is a graph showing the influence of $Al_2O_3$ content on slaking resistance of calcia refractory containing no MgO.
Figure 2:
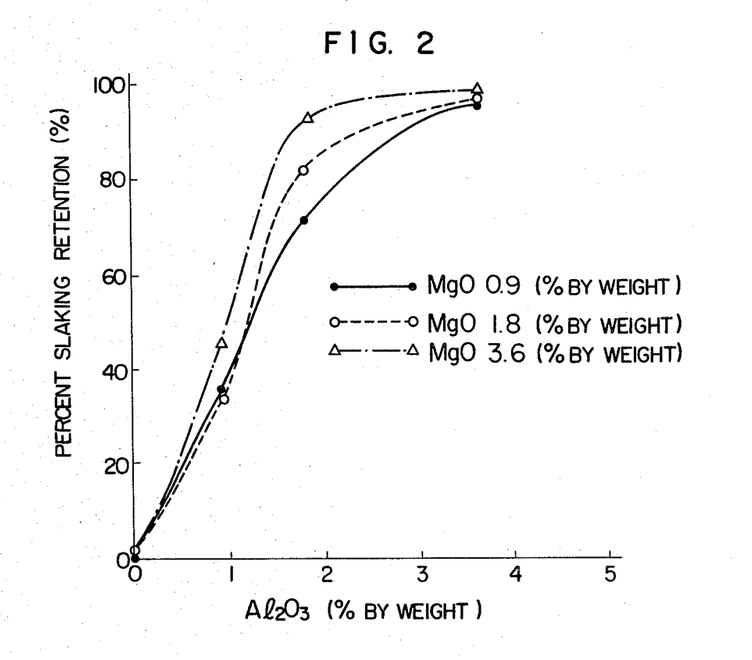
FIG. 2 is a graph showing the influence of $Al_2O_3$ and MgO contents on slaking resistance of calcia refractory containing 0.45% by weight of $SiO_2$.
Figure 3:
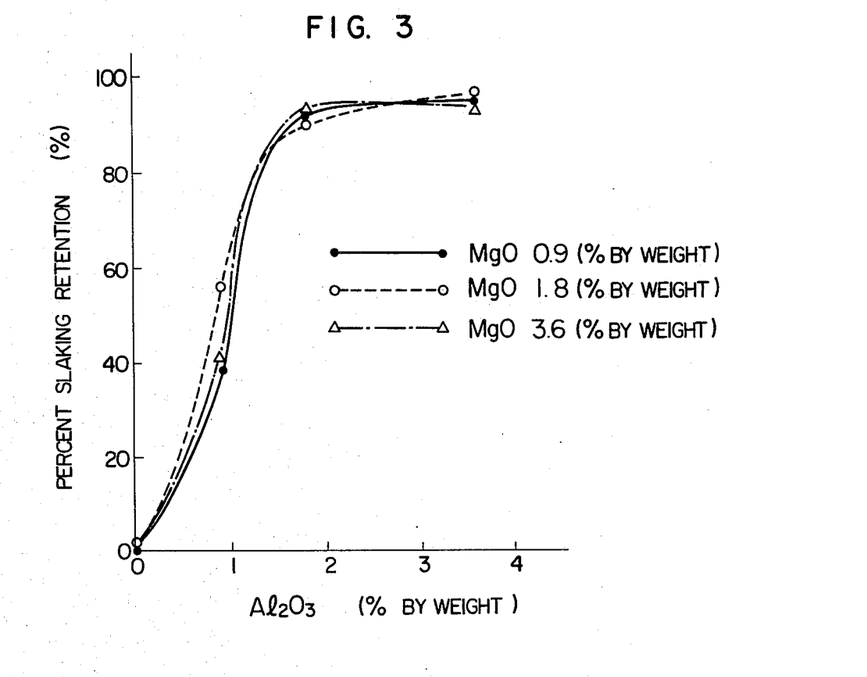
FIG. 3 is a graph showing the influence of $Al_2O_3$ and MgO contents on slaking resistance of calcia refractory containing 0.9% by weight of $SiO_2$.
Figure 4:
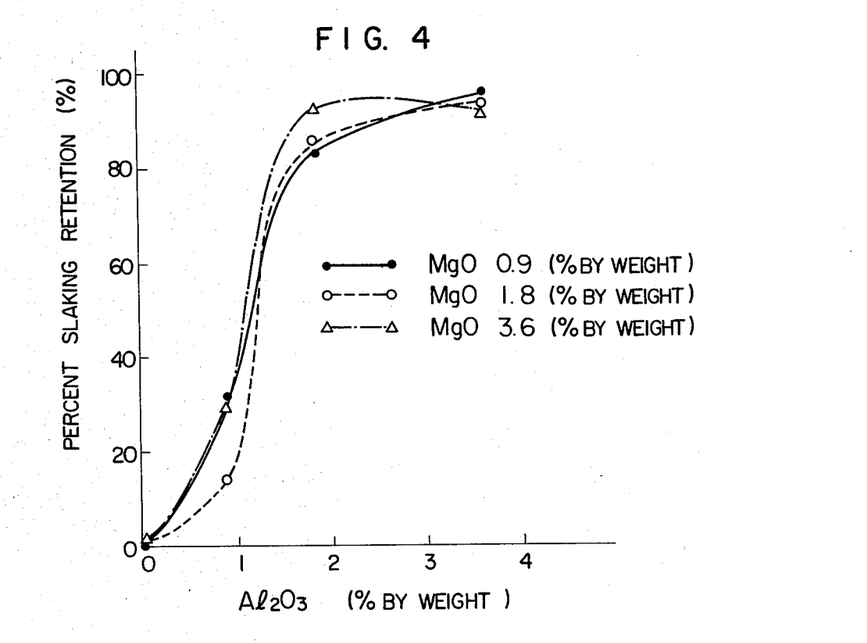
FIG. 4 is a graph showing the influence of $Al_2O_3$ and MgO contents on slaking resistance of calcia refractory containing 1.8% by weight of $SiO_2$.

FIGS. 1-4 are the graphic representations of the results of the slaking resistance test (determination of the percent slaking retention after one-hour treatment in an autoclave under 5 atm.) in the cases where the silicon dioxide content was 0.45, 0.90 and 1.80% by weight, respectively. FIG. 1 is a graph showing the influence of the $SiO_2$ and $Al_2O_3$ contents on the slaking resistance of a calcia refractory containing no MgO, FIG. 2 is a graph showing the influence of the $Al_2O_3$ and MgO contents on the slaking resistance of a calcia refractory containing 0.45% by weight of $SiO_2$, FIG. 3 is a graph showing the influence of the $Al_2O_3$ and MgO contents on the slaking resistance of a calcia refractory containing 0.9% by weight of $SiO_2$, and FIG. 4 is a graph showing the influence of the $Al_2O_3$ and MgO contents on the slaking resistance of a calcia refractory containing 1.8% by weight of $SiO_2$.

"Percent slaking retention" was determined by putting into an autoclave the clinker pulverised to a size range of from 3 to 4 meshes, drying same for a predetermined period of time, then passing it through a 6-mesh screen and measuring the amount of clinker left on the screen.

As seen from FIG. 1, in case no magnesium oxide is contained, with the silicon dioxide content being within the range of 0.45-1.80% by weight, the percent slaking retention becomes higher than 80%, indicating a marked improvement of slaking resistance, when the aluminum oxide content increases over 2.5% by weight irrespective of the silicon dioxide content, and when the aluminum oxide content exceeds 3.6% by weight, there is obtained a slaking retention over 90%. In the clinker with silicon dioxide content of 0.45% by weight, there is seen a decreasing tendency of slaking resistance when the aluminum oxide content is higher than 5% by weight. Therefore, in case no magnesium oxide is contained, it is desirable to contain aluminum oxide in an amount of about 3-7% by weight.

In case magnesium oxide is contained and the silicon dioxide content is 0.45% by weight (FIG. 2), the slaking resistance elevates as the aluminum oxide content increases. The clinker containing 3.6% by weight of magnesium oxide shows a percent slaking retention in autoclave of higher than 80% with 1.5% by weight of aluminum oxide content, and when the aluminum oxide content exceeds 1.8% by weight, there is provided a slaking retention over 90%. The higher the magnesium oxide content, the less may be the aluminum oxide content for obtaining a given slaking resistance. In case the silicon dioxide content is 0.9% by weight (FIG. 3), the difference in slaking resistance according to the magnesium oxide content is minimized. For providing a percent slaking retention over 80%, it suffices to contain aluminum oxide in an amount of 1.5% by weight in case the magnesium oxide content is within the range of 0.9-3.6% by weight.

In the case of 1.8% by weight silicon dioxide (FIG. 4), the results are analogous to those in the case of 0.9% by weight, that is, when the magnesium oxide content is 3.6% by weight, a percent slaking retention over 90% is obtained with 1.8% by weight aluminum oxide. When the magnesium oxide content is less than 1.8% by weight, however, 3.6% by weight aluminum oxide is needed for providing an autoclave percent slaking retention above 90%. With any of said magnesium oxide contents, there can be obtained a percent slaking retention of higher than 80% by containing aluminum oxide in an amount greater than 1.5% by weight.

Rounding off the foregoing results, it is learned that the aluminum oxide and magnesium oxide contents should be as defined in FIG. 5 for obtaining a calcia refractory with excellent slaking resistance, that is, one having a percent slaking retention over 80% and over 90%.

In FIG. 5, the area enclosed by the lines connecting the points A, B, C and D is the region where a percent slaking retention over about 80% is provided. Point A represents 2.5% by weight aluminum oxide and zero magnesium oxide, point B represents 1.5% by weight aluminum oxide and 1.5% by weight magnesium oxide, point C represents 1.5% by weight aluminum oxide and 8.5% by weight magnesium oxide, and point D represents 10% by weight aluminum oxide and zero magnesium oxide.

In the same figure, the area enclosed by the lines connecting the points D, E, F and G is the region where a percent slaking retention over about 90% is provided. Point E represents 3% by weight aluminum oxide and zero magnesium oxide, point F represents 2% by weight aluminum oxide and 3% by weight magnesium oxide, and point G represents 2% by weight aluminum oxide and 8% by weight magnesium oxide. In this case, it is desirable that the silicon dioxide content is maintained within the range of 0.7-2% by weight.

The refractory with a percent slaking retention below 80% involves the problems in its practical use.

Iron oxide is very beneficial for sintering of calcia refractories. However, in case iron oxide is contained as impurity in an amount less than 0.4% by weight as in this invention, if the firing temperature is 1,400° C., no satisfactory growth of CaO crystals is attained as shown in Table 1 and also sinterability of the product is poor as seen in Table 2, so that it is recommended to perform firing at a temperature above 1,500° C. Firing at 1,500° C. facilitates sinterring and improves slaking resistance.

TABLE 1

| Specimen No. | Components (wt %) | | | CaO crystal grain size (μm) | |
|---|---|---|---|---|---|
| | $SiO_2$ | $Al_2O_3$ | MgO | 1,400° C. | 1,500° C. |
| 1 | 0.9 | 3.6 | <0.01 | 25–40 | 40–60 |
| 2 | 0.9 | 3.6 | 0.9 | 25–40 | 40–60 |
| 3 | 0.9 | 3.6 | 1.8 | 25–35 | 40–60 |
| 4 | 0.9 | 3.6 | 3.6 | 25–35 | 40–60 |
| 5 | 0.9 | 1.8 | 1.8 | 25–35 | 35–60 |

TABLE 2

| Specimen No. | Firing shrinkage (%) | | Porosity after firing (%) | | Percent slaking retention after 1-hour·5-atom autoclave dealing (%) | |
|---|---|---|---|---|---|---|
| | 1,400° C. | 1,500° C. | 1,400° C. | 1,500° C. | 1,400° C. | 1,500° C. |
| 1 | 30.7 | 35.7 | 31.5 | 1.5 | 0 | 88.8 |
| 2 | 31.6 | 36.2 | 27.6 | 0.5 | 0 | 95.0 |
| 3 | 32.4 | 36.5 | 23.5 | 0.5 | 0 | 96.1 |
| 4 | 35.1 | 37.2 | 1.8 | 0.5 | 27.7 | 95.7 |
| 5 | 32.3 | 36.1 | 26.4 | 0.5 | 0 | 90.4 |

Experimental Example 2

In order to determine the influence of the boron oxide ($B_2O_3$) content on slaking resistance of calcia refractories, there were prepared the clinker specimens of various chemical compositions shown in Table 3, and these clinker specimens were fired at 1,400° C. and 1,500° C. and the relation between $B_2O_3$ content (wt%) and percent slaking retention (%) was examined.

TABLE 3

| Specimen No. | $SiO_2$ | $Al_2O_3$ | $Fe_2O_3$ | MgO | CaO |
|---|---|---|---|---|---|
| A | 0.9 | <0.1 | 0.9 | 3.6 | 94.5 |
| B | 0.9 | <0.1 | 0.9 | 7.2 | 90.9 |
| C | 0.9 | 0.9 | 0.9 | <0.1 | 97.2 |
| D | 0.9 | 1.8 | 0.9 | 1.8 | 94.6 |
| E | 0.9 | 3.6 | 0.9 | <0.1 | 94.5 |
| F | 0.9 | 3.6 | 0.45 | <0.1 | 94.9 |
| G | 0.9 | 7.2 | 0.45 | <0.1 | 91.3 |
| H | 0.9 | 9.0 | 0.45 | <0.1 | 89.5 |
| I | 0.9 | 3.6 | <0.1 | <0.1 | 95.3 |
| J | 0.9 | 1.8 | <0.1 | 1.8 | 95.4 |
| K | 0.9 | 1.8 | 1.8 | 1.8 | 93.7 |
| L | 0.9 | <0.1 | 3.6 | 1.8 | 93.6 |
| M | 0.9 | 3.6 | <0.1 | 1.8 | 93.6 |
| N | 0.9 | 3.6 | <0.1 | 3.6 | 91.8 |

Figure 6:
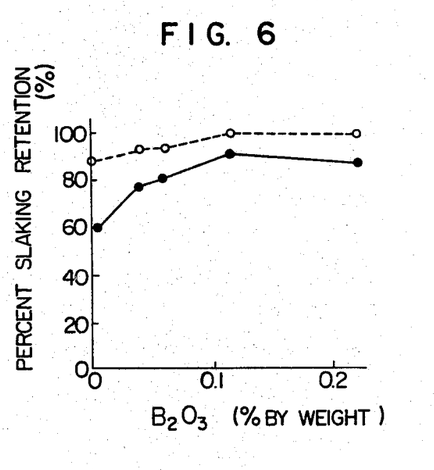
FIGS. 6–19 are the graphs showing the influence of the content of added $B_2O_3$ on percent slaking retention (%) in various particulate calcia refractories (hereinafter referred to as clinker) of the compositions according to this invention.
Figure 8:
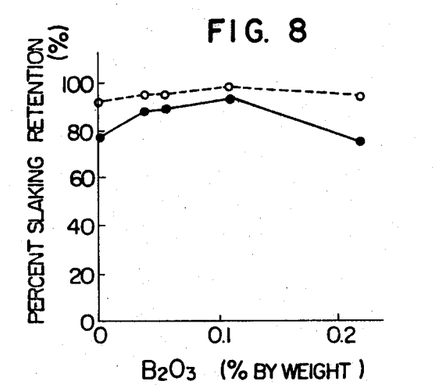
Figure 9:
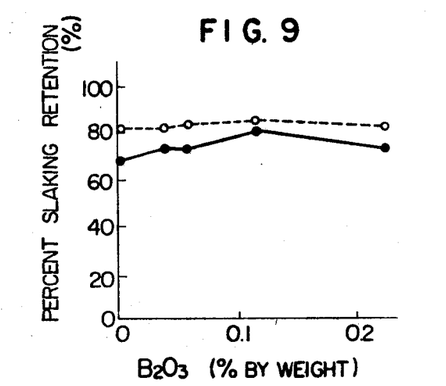
Figure 10:
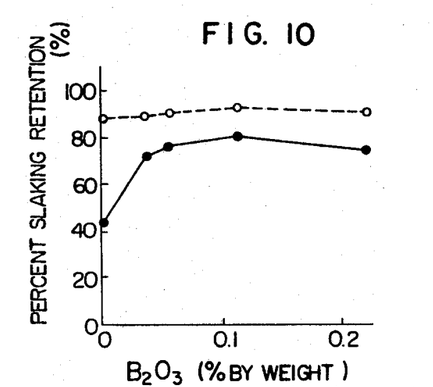
Figure 11:
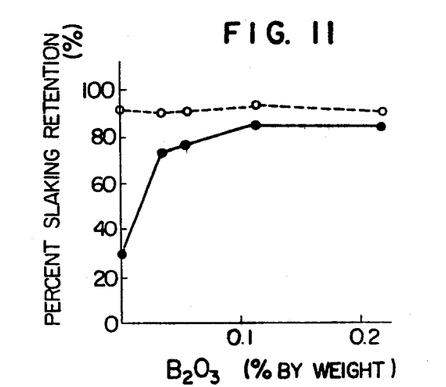
Figure 13:
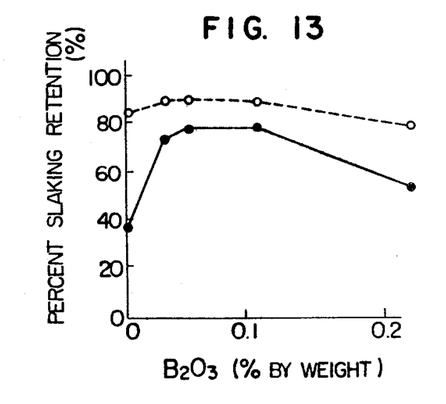
Figure 14:
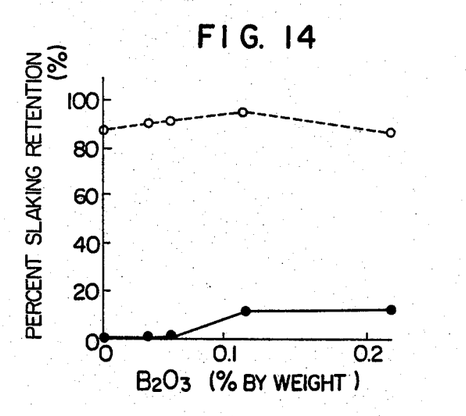
Figure 15:
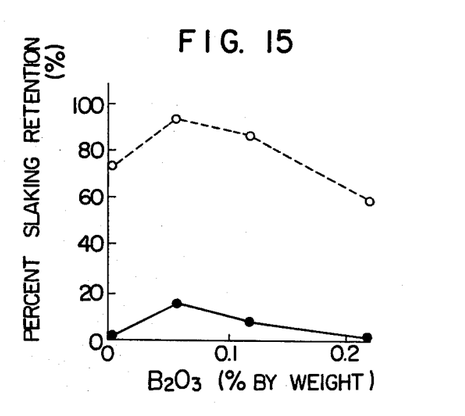
Figure 16:
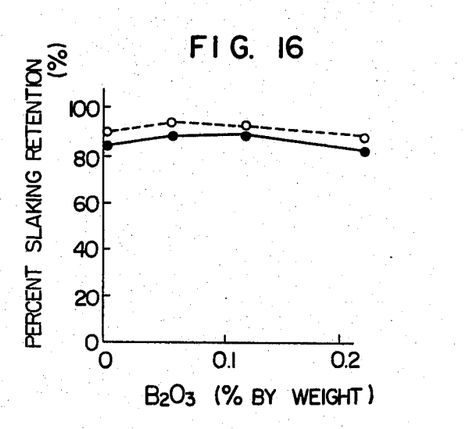
Figure 17:
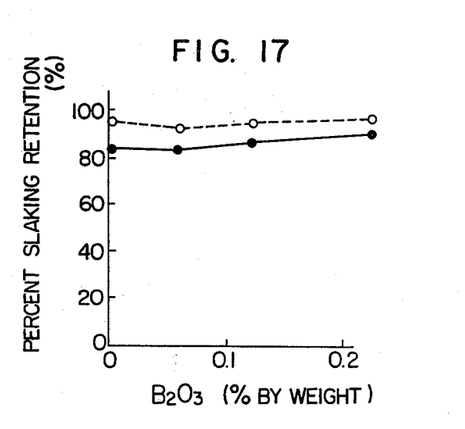

FIGS. 6–19 are the graphs showing the relation between $B_2O_3$ content and percent slaking retention as observed by firing the clinker specimens of Table 3 at 1,400° C. (indicated by ─────────) and at 1,500° C. (indicated by o─────────o). FIG. 6 shows the results obtained with clinker specimen A, FIG. 7 with clinker specimen B, FIG. 8 with clinker specimen C, FIG. 9 with clinker specimen D. FIG. 10 with clinker specimen E, FIG. 11 with clinker specimen F, FIG. 12 with clinker specimen G, FIG. 13 with clinker specimen H, FIG. 14 with clinker specimen I, FIG. 15 with clinker specimen J, FIG. 16 with clinker specimen K, FIG. 17 with clinker specimen L, FIG. 18 with clinker specimen M, and FIG. 19 with clinker specimen N.

Figure 7:
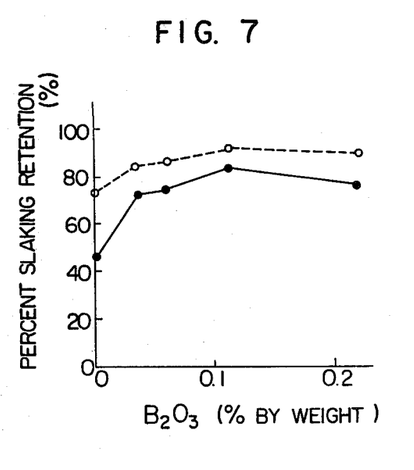
Figure 12:
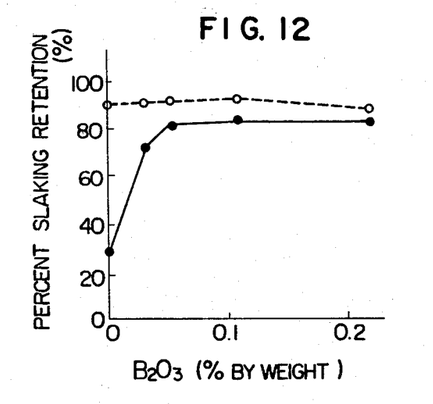
Figure 18:
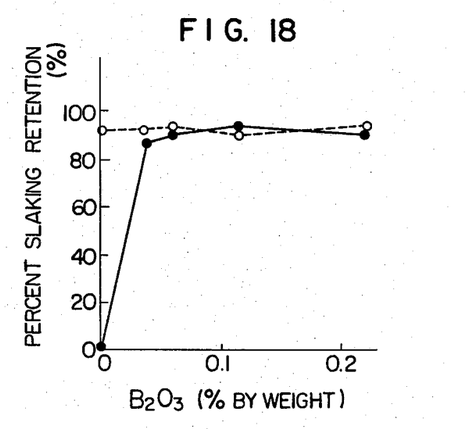
Figure 19:
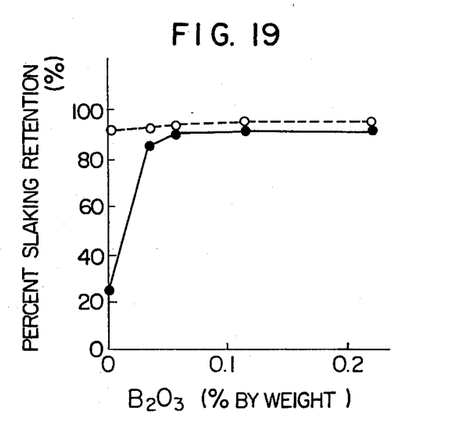

As seen from these graphic demonstrations, in case the iron oxide content is over 1.8% by weight ("% by weight" being hereinafer referred to merely as "%") (see FIGS. 16 and 17 for specimens K and L), the effect of boron oxide is very small regardless of the contents of other components, while in the specimens containing little iron oxide (specimens I, J, M and N) an extremely high low-temperature sintering effect is noted. In the case of the specimens containing little iron oxide but containing 3.6% of aluminum oxide and more than 1.8% of magnesium oxide (specimens M and N), their low-temperature sinterability is markedly improved when approximately 0.03% of boron oxide is contained, and these boron oxide-containing specimens show almost as high slaking resistance by firing at 1,400° C. as that in other specimens fired at 1,500° C. As regards the contents of aluminum oxide and magnesium oxide, there is noted a visible effect by containment of boron oxide when the aluminum oxide content is 9% or the magnesium content is 7.2% or when the sum of aluminum oxide and magnesium oxide contents is 7.2% in case both of them are present, as seen from FIG. 7 representing clinker specimen B with 7.2% magnesium oxide, FIG. 12 representing specimen H with 9.0% aluminum oxide and FIGS. 18 and 19 representing specimens M and N with 5.4% and 2.2% aluminum oxide+magnesium oxide. However, excess increase of aluminum oxide and/or magnesium oxide results in a reduced purity of clacia clinker and also deteriorates the essential properties of calcia refractory such as thermal shock resistance, high-temperature strength and high-temperatuure stability, so that the content of one of aluminum oxide and magnesium oxide or the total content of both of them must be kept within the limit of 10% by weight.

Now, the reasons for which the successful attainment of said slaking resistance in the products of this invention was provided are explained by discussing the influence of $B_2O_3$ content on the various clinker properties by spotlighting specimens I and J which are the typical examples of clinker preparations in accordance with this invention.

Figure 20:
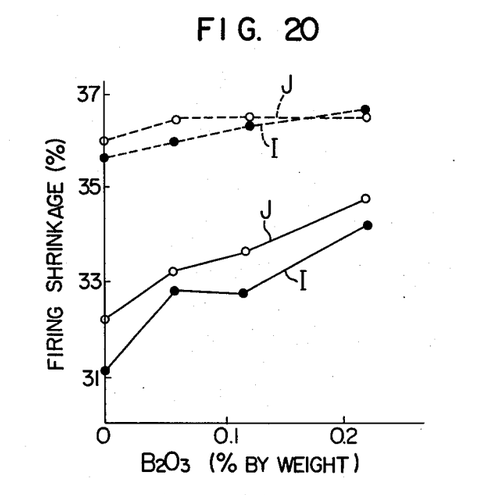
FIG. 20 is a graph showing the influence of $B_2O_3$ on firing shrinkage of the clinker.
Figure 21:
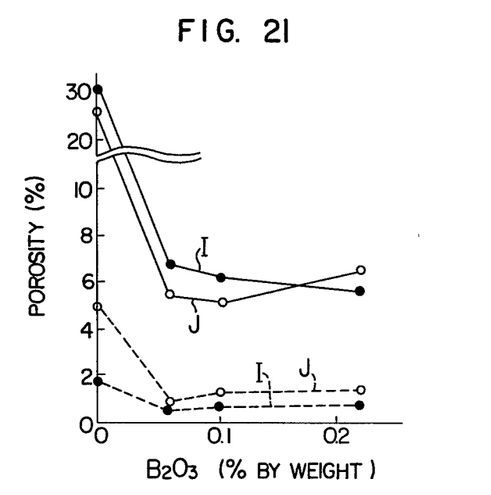
FIG. 21 is a graph showing the influence of $B_2O_3$ content on porosity of the clinker.
Figure 22:
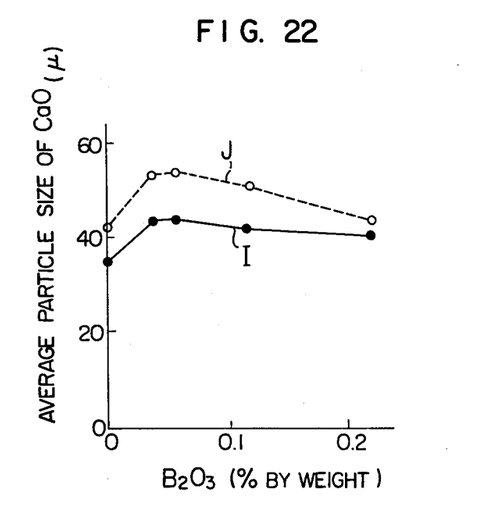
FIG. 22 is a graph showing the influence of $B_2O_3$ content on average particle size of CaO.

FIG. 20 is a graph showing the relation between $B_2O_3$ content and firing shrinkage, and FIG. 21 is a graph showing the relation between $B_2O_3$ content and porosity, and in these graphs, full line represents firing at 1,400° C. and dotted line represents firing at 1,500° C. FIG. 22 is a graph showing the relation between $B_2O_3$ content and average particle size of CaO crystal grains.

As seen from FIGS. 20 and 21, addition of $B_2O_3$, which has a $CaO$-$B_2O_3$ eutectic point, further lowers the melting point of the clinker matrix constituted by such low-melting material as $3CaO.Al_2O_3$, $5CaO.3Al_2O_3$ or $3(Ca, Mg)O.Al_2O_3.3SiO_2$ and thus promotes sintering of the clinker when fired. It is also appreciated from FIG. 22 that formation of such low-melting matrix facilitates the growth of the CaO crystal grains, and this phenomenon is considered conductive to the antislaking resistance in the clinker of this invention.

The restricted low-temperature sintering effect of $B_2O_3$ in case iron oxide is contained more than 1.8% is due to the fact that the low-temperature sintering nature is maintained owing to the presence of iron oxide and other coexisting components even if no $B_2O_3$ is contained. As viewed above, $B_2O_3$ produces a prominent effect by its presence of about 0.03–0.2%, desirably 0.05–0.15%, but it is to be noted that the presence of $B_2O_3$ in excess of 0.2% does not give a correspondingly high effect, and particularly too high a content thereof results in the reduction of hot strength, thermal shock resistance and high-temperature stability of the produced refractory, so that the content of $B_2O_3$ must be controlled within the minimum necessary range.

Figure 23:
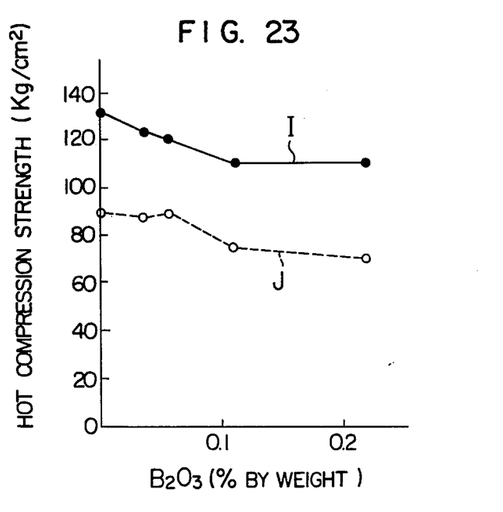
FIG. 23 is a graph showing the influence of $B_2O_3$ content on hot strength of the clinker.
Figure 24:
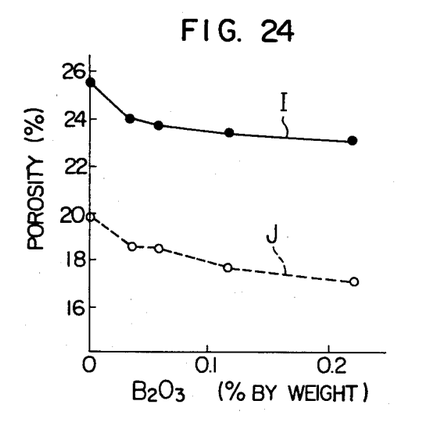
FIG. 24 is a graph showing the influence of $B_2O_3$ content on porosity of the clinker.
Figure 25:
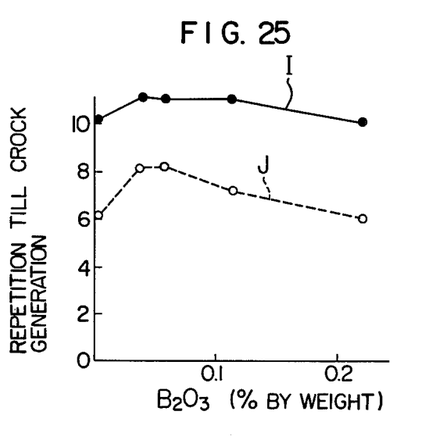
FIG. 25 is a graph showing the influence of $B_2O_3$ content on thermal shock resistance of the clinker.
Figure 26:
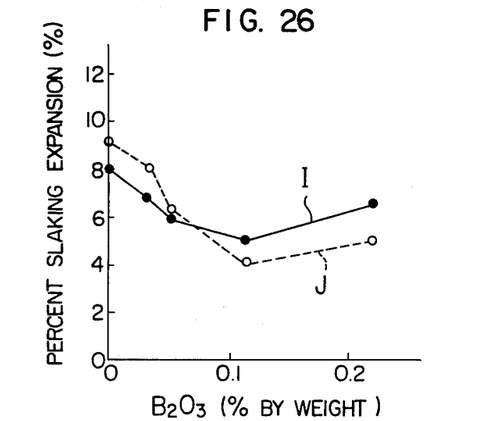
FIG. 26 is a graph showing the influence of $B_2O_3$ content on slaking resistance in case the clinker was left at 20° C. and 80% RH.

FIGS. 23–26 are the graphs showing the results of the experiments conducted on said clinker specimen I (graph of ⎯⎯⎯⎯⎯⎯) and specimen J (graph of o⎯⎯⎯⎯⎯⎯o) for clarifying the influence of $B_2O_3$ content on the various properties of the refractory, in which FIG. 23 shows the influence on hot strength, FIG. 24 the influence on porosity, FIG. 25 the influence on thermal shock resistance (measured by repetitions till crack generation) and FIG. 26 the influence on percent slaking expansion (when clinker was left at 20° C. and 80% RH).

Each clinker specimen used was prepared by shaping the clinker composition into a size of 30 mm in diameter × 10 mm high, firing same in a furnace with a silicon carbide resistance heater at 1,500° C. for one hour, pulverizing the fired material, mixing the pulverized material consisting of 40% of −20- to +100-mesh particles and 60% of −100-mesh particles, adding 4% of linseed oil, shaping the mixture to 30 mm in diameter × 300 mm high by 10 times of repeated stamping with a sand rammer, drying the shaped mixture and further firing same at 1,500° C. to form a test piece.

Porosity is reduced by containment of $B_2O_3$ as shown in FIG. 24 while hot strength lowers slightly as the $B_2O_3$ content increases due to the influence of the low-melting matrix as shown in FIG. 23. However, thermal shock resistance and slaking resistance elevate by containment of $B_2O_3$ in an amount of 0.03–0.15%. As the slaking resistance and sinterability of the clinker are also improved by addition of 0.05–0.15%, the optimum $B_2O_3$ content for the products of this invention is defined to be 0.05–0.15%.

Figure 27:
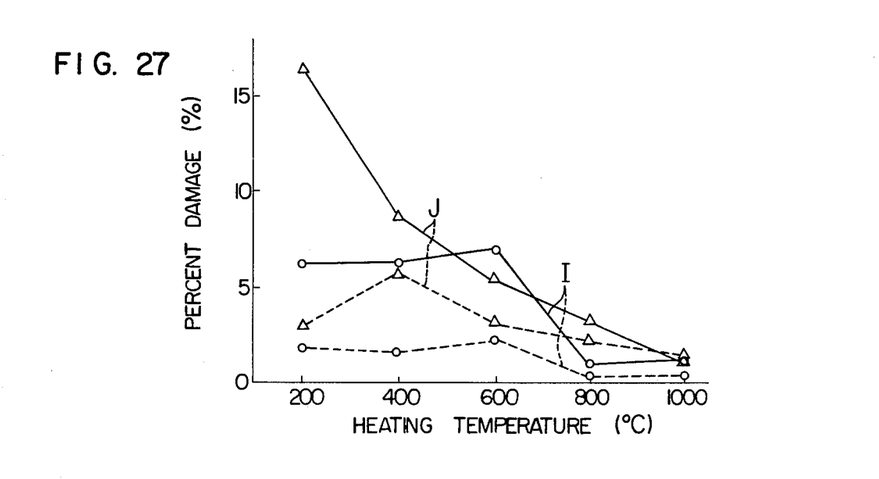
FIG. 27 is a graph showing the influence of $B_2O_3$ content on breakage rate of clinker pellets in the course of firing.

FIG. 27 shows the percent breakage rate lowering effect by the addition of $B_2O_3$ in said clinker specimens I and J in the process of firing. In the diagram, o⎯⎯⎯o represents the case where 20% of water was added in clinker specimen I, o⎯⎯⎯⎯⎯⎯o the case where 20% of water and 0.06% of $B_2O_3$ were added in clinker specimen I, ▲⎯⎯⎯⎯▲ the case where 20% of water was added in clinker specimen J, and △ ⎯⎯⎯⎯⎯⎯△ the case where 20% of water and 0.06% of $B_2O_3$ were added in specmen J. The test pieces, admixed with 20% of water or with 20% of water and 0.06% of $B_2O_3$, were press-shaped into 13 mm in diameter × 13 mm high, dried at 110° C. for 2 hours, then kept in the furnace with a silicon carbide resistance heater at 200° C., 400° C., 600° C., 800° C. and 1,000° C. for 2 hours each and thereafter passed through a vibrating screen for 3 minutes, and the portion with +8 meshes was weighed out to determine the percent breakage rate per munute. As $B_2O_3$ is melted at 400°–600° C. to bind the particles of the blended materials, it is helpful for reducing the breakage rate in the course of calcination where the particles are mostly liable to suffer damage, and when the sintering temperature is reached, a low-temperature sintering effect is provided by $B_2O_3$ to improve the firing yield as shown in FIG. 27.

Since the blended materials such as raw calcia, aluminum oxide and magnesium oxide contain little boron oxide, or less than 0.01% if any, boron oxide is usually added to a predetermined content. Industrial boron oxide can be conveniently used, but it is also possible to use sodium borate which is a generally available boron compound. In the case of sodium borate, since its salts hydrate (salts containing crystal water) are hard to pulverize and low in solubility and hence cannot be easily added as an aqueous solution, this compound is first dehydrated by heating above 200° C., usually around 500° C., and then pulverized. Although sodium oxide exists with $B_2O_3$ in said compound, its effect is substantially same as in the case of boron oxide.

Figure 28:
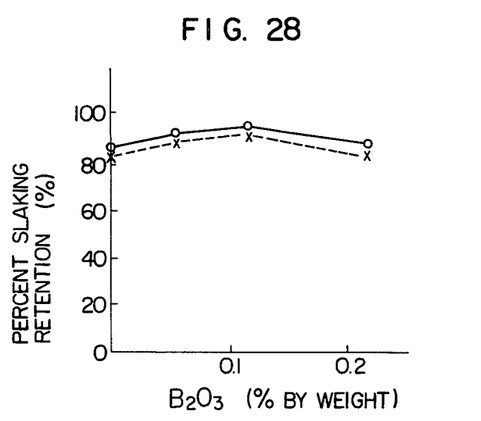
FIG. 28 is a graph showing a comparison between boron oxide and sodium borate regarding their contribution to slaking resistance.

FIG. 28 shows the influence of the content of boron oxide and sodium borate, both in terms of $B_2O_3$, on the slaking resistance. In the figure, ✗⎯⎯⎯⎯⎯⎯✗ represents the case of sodium borate and o⎯⎯⎯⎯o the case of boron oxide. In the case of sodium borate, it is proper to add this compound in an amount of approximately 0.1% in terms of $B_2O_3$.

Use of the said clinker compositions according to this invention allows production of slaking-resistant calcia clinker by firing at a temperature above 1,350° C., preferably above 1,400° C.

Example 1

1.8% by weight of calcined alumina powder (99% purity) was added to limestone powder having the chemical composition (wt%) shown in Table 4, and they were mixed by a wet pan mill. Then the mixture was press-shaped into pellets of 30 mm in diameter × 300 m high, dried and fired at 1,500° C. for one hour. The chemical composition (wt%) and properties of the obtained refractory are shown in Table 5.

TABLE 4

| $SiO_2$ | $Al_2O_3$ | $Fe_2O_3$ | MgO | CaO | Ignition loss |
|---|---|---|---|---|---|
| 0.40 | 0.14 | 0.06 | 0.08 | 55.78 | 43.40 |

TABLE 5

| $SiO_2$ | $Al_2O_3$ | $Fe_2O_3$ | MgO | CaO | Slaking retention (%) | Firing shrinkage (%) | Porosity (%) |
|---|---|---|---|---|---|---|---|
| 0.69 | 3.41 | 0.10 | 0.14 | 95.37 | 93.0 | 36.1 | 3.2 |

Example 2

2% by weight of aluminum hydroxide (65% $Al_2O_3$) was added to calcium hydroxide powder having the chemical composition (wt%) shown in Table 6 and they were mixed by a wet pan mill. The mixture was press-shaped into pellets of 30 mm in diameter × 10 mm high, dried and fired at 1,500° C. for one hour. The composition (wt%) and properties of the resulting refractory are shown in Table 7.

stamping with a sand rammer and then fired in a furnace with a silicon carbide resistance heater at 1,500° C. for one hour.

The physical properties of the obtained bricks are shown in Table 9.

TABLE 9

| Specimen No. | Water absorption (%) | Apparent specific gravity | Bulk specific gravity | Porosity (%) | Compression strength (kg/cm$^2$) | Hot compression strength at 1400° C. (kg/cm$^2$) | Thermal shock test 1200° C. heating and air cooling | Slag absorption test, 1550° C., one hour | Slaking resistance after standing at 20° C. and 80% RH |
|---|---|---|---|---|---|---|---|---|---|
| 1 | 10.9 | 3.25 | 2.40 | 26.2 | 420 | 130 | Cracks developed at 10th cycle. No wear-off in 15 cycles. | No absorption | +8% (after 10-day standing) |
| 2 | 10.0 | 3.21 | 2.42 | 24.6 | 360 | 100 | Cracks developed at 8th cycle. No wear-off in 15 cycles. | No absorption | +5% (after 10-day standing) |
| 3 | 8.1 | 3.08 | 2.47 | 19.9 | 320 | 90 | Cracks developed at 6th cycle. No wear-off in 15 cycles. | No absorption | +5% (after 10-day standing) |
| 4 | 10.5 | 3.28 | 2.46 | 25.7 | 140 | 20 | Cracks developed at 3rd cycle. 10% wear-off in 8 cycles. | No absorption | +2% (after 10-day standing) (Coefficient of linear expansion) |

TABLE 6

| SiO$_2$ | Al$_2$O$_3$ | Fe$_2$O$_3$ | MgO | CaO | Ignition loss |
|---|---|---|---|---|---|
| 0.35 | 0.36 | 0.14 | 1.42 | 73.80 | 23.90 |

TABLE 7

| SiO$_2$ | Al$_2$O$_3$ | Fe$_2$O$_3$ | MgO | CaO | Slaking retention (%) | Firing Shrinkage (%) | Porosity (%) |
|---|---|---|---|---|---|---|---|
| 0.46 | 2.55 | 0.18 | 1.83 | 96.24 | 9.14 | 36.8 | 0.7 |

Shown below are the physical properties of the bricks produced by using the calcia refractories obtained in accordance with this invention.

The chemical compositions (wt%) of the refractory specimens used for the production of bricks are shown in Table 8. Specimen 4 is a comparative example.

TABLE 8

| Specimen No. | Composition | | | | |
|---|---|---|---|---|---|
| | SiO$_2$ | Al$_2$O$_3$ | MgO | Fe$_2$O$_3$ | CaO |
| 1 | 0.89 | 3.61 | 0.01 | <0.01 | 95.46 |
| 2 | 0.89 | 1.79 | 3.55 | <0.01 | 93.70 |
| 3 | 0.90 | 1.79 | 1.82 | 0.44 | 95.02 |
| 4 | 0.90 | 0.18 | 3.60 | 3.61 | 91.60 |

Each refractory specimen was pulverized and regulated in particle size such that 40% of the particle are those with sizes of −8 to +100 meshes and 60% are those with −100 meshes, and then the powder was admixed with 3% of linseed oil, kneaded and shaped into 30 mm in diameter × 30 mm high by 10 times of Example 3

1.8% of calcined alumina powder (99% purity) was added to limestone powder having the chemical composition (wt%) shown in Table 10 below, and after further adding 0.03% (by weight) of industrial boric anhydride, said materials were mixed by a wet pan mill. Then the mixture was press-shaped into pellets of 30 mm in diameter × 30 mm high, dried and then fried at 1,400° C. for one hour. The chemical composition (wt%) and properties of the obtained clinker are shown in Table 11.

TABLE 10

| SiO$_2$ | Al$_2$O$_3$ | Fe$_2$O$_3$ | MgO | CaO | Ignition loss | B$_2$O$_3$ |
|---|---|---|---|---|---|---|
| 0.40 | 0.14 | 0.06 | 0.99 | 55.30 | 43.36 | trace |

TABLE 11

| SiO$_2$ | Al$_2$O$_3$ | Fe$_2$O$_3$ | MgO | CaO | B$_2$O$_3$ | Porosity (%) | Slaking retention (%) | Firing shrinkage (%) |
|---|---|---|---|---|---|---|---|---|
| 0.69 | 3.40 | 0.10 | 1.82 | 93.90 | 0.06 | 0.5 | 93.7 | 36.3 |

Example 4

2% by weight of aluminum hydroxide (65% Al$_2$O$_3$) was added to calcium hydroxide powder (with trace of B$_2$O$_3$) having the chemical composition (wt%) shown in Table 6, and after further adding 0.05% by weight of industrial boric anhydride, they were mixed by a wet pat mill. Then the mixture was press-shaped into pellets of 30 mm in diameter × 10 mm high, dried and fired at 1,500° C. for one hour. The composition (wt%) and properties of the obtained clinker are shown in Table 12.

TABLE 12

| SiO$_2$ | Al$_2$O$_3$ | Fe$_2$O$_3$ | MgO | CaO | B$_2$O$_3$ | Porosity (%) | Slaking retention (%) | Firing shrinkage (%) |
|---|---|---|---|---|---|---|---|---|
| 0.46 | 2.15 | 0.18 | 1.83 | 96.24 | 0.06 | 0.3 | 95.7 | 36.8 |

Example 5

1.8% of calcined alumina powder (99% purity) was added to limestone powder (with trace of $B_2O_3$) having the chemical composition (wt%) shown in Table 4, followed by further addition of 0.05% by weight of industrial dehydrated borax and wet mixing of the materials by a wet pan mill. The mixture was press-shaped into pellets of 30 mm in diameter × 30 mm high, dried and then fired at 1,500° C. for one hour. The chemical composition (wt%) and properties of the obtained clinker are shown in Table 13.

TABLE 13

| $SiO_2$ | $Al_2O_3$ | $Fe_2O_3$ | MgO | CaO | $B_2O_3$ | Porosity (%) | Slaking retention (%) | Firing shrinkage (%) |
|---|---|---|---|---|---|---|---|---|
| 0.69 | 3.34 | 0.10 | 0.14 | 95.64 | 0.08 | 0.6 | 93.7 | 36.9 |

What is claimed is:

1. A slaking-resistant calcia refractory consisting essentially of as a fired mixture, (a) 2% by weight or less of silicon dioxide, (b) aluminum oxide ($Al_2O_3$) and magnesium oxide (MgO) of the amount defined in the graph of FIG. 5 as within the region enclosed by the lines connecting point A (2.5 wt% $Al_2O_3$ and 0 wt% MgO), point B (1.5 wt% $Al_2O_3$ and 1.5 wt% MgO), point C (1.5 wt% $Al_2O_3$ and 8.5 wt% MgO) and point D (10 wt% $Al_2O_3$ and 0 wt% MgO), (c) 0.9% by weight or less of iron oxide, and (d) a predominant amount of calcium oxide.

2. The slaking-resistant calcia refractory according to claim 1, wherein the fired mixture is particulate.

3. A slaking-resistant calcia refractory which is a brick fired to a predetermined shape, consisting essentially of (a) 2% by weight or less of silicon dioxide, (b) aluminum oxide ($Al_2O_3$) and magnesium oxide (MgO) of the amount defined in the graph of FIG. 5 as within the region enclosed by the lines connecting point A (2.5 wt% $Al_2O_3$ and 0 wt% MgO), point B (1.5 wt% $Al_2O_3$ and 1.5 wt% MgO), point C (1.5 wt% $Al_2O_3$ and 8.5 wt% MgO) and point D (10 wt% $Al_2O_3$ and 0 wt% MgO), (c) 0.9% by weight or less of iron oxide, and (d) a predominant amount of calcium oxide.

4. A slaking-resistant calcia refractory consisting essentially of, as a fired mixture, (a) 0.7-2% by weight of silicon dioxide, (b) aluminum oxide ($Al_2O_3$) and magnesium oxide (MgO) of the amount defined in the graph of FIG. 5 as within the region enclosed by the lines connecting point E (3 wt% $Al_2O_3$ and 0 wt% MgO), point F (2 wt% $Al_2O_3$ and 3 wt% MgO), point G (2 wt% $Al_2O_3$ and 8 wt% MgO) and point D (10 wt% $Al_2O_3$ and 0 wt% MgO), (c) 0.4% by weight or less of iron oxide, and (d) a predominant amount of calcium oxide.

5. The slaking-resistant calcia refractory according to claim 4, where the fired mixture is particulate.

6. The slaking-resistant calcia refractory according to claim 4, wherein the fired mixture is a brick fired to a predetermined shape.

7. A slaking-resistant calcia refractory consisting essentially of, as a fired mixture, (a) 2% by weight or less of silicon dioxide, (b) aluminum oxide ($Al_2O_3$) and magnesium oxide (MgO) of the amount defined in the graph of FIG. 5 as within the region enclosed by the lines connecting point A (2.5 wt% $Al_2O_3$ and 0 wt% MgO), point B (1.5 wt% $Al_2O_3$ and 1.5 wt% MgO), point C (1.5 wt% $Al_2O_3$ and 8.5 wt% MgO) and point D (10 wt% $Al_2O_3$ and 0 wt% MgO), (c) 0.9% by weight or less of iron oxide, (d) 0.03-0.2% by weight of boron oxide, and (e) a predominant amount of calcium oxide.

8. The slaking-resistant calcia refractory according to claim 7, wherein the fired mixture is particulate.

9. A slaking-resistant calcia refractory which is a brick fired to a predetermined shape, consisting essentially of (a) 2% by weight of silicon dioxide, (b) aluminum oxide ($Al_2O_3$) and magnesium oxide (MgO) of the amount defined in the graph of FIG. 5 as within the region enclosed by the lines connecting point A (2.5 wt% $Al_2O_3$ and 0 wt% MgO), point B (1.5 wt% $Al_2O_3$ and 1.5 wt% MgO), point C (1.5 wt% $Al_2O_3$ and 8.5 wt% MgO) and point D (10 wt% $Al_2O_3$ and 0 wt% MgO), (c) 0.3-0.9% by weight of iron oxide, (d) 0.03-0.2% by weight of boron oxide, and (e) a predominant amount of calcium oxide.

10. The slaking-resistant calcia refractory according to claim 1, wherein the remainder of the refractory is calcium oxide.

11. The slaking-resistant calcia refractory according to claim 3, wherein the remainder of the refractory is calcium oxide.

12. The slaking-resistant calcia refractory according to claim 4, wherein the remainder of the refractory is calcium oxide.

13. The slaking-resistant calcia refractory according to claim 7, wherein the remainder of the refractory is calcium oxide.

14. The slaking-resistant calcia refractory according to claim 9, wherein the remainder of the refractory is calcium oxide.

15. The slaking-resistant calcia refractory according to claim 1, wherein the refractory contains at least 81% by weight of calcium oxide.

16. The slaking-resistant calcia refractory according to claim 7, wherein the refractory contains at least 81% by weight of calcium oxide.

17. The slaking-resistant calcia refractory according to claim 7, wherein said refractory contains 0.05-0.15% by weight of boron oxide.

18. The slaking-resistant calcia refractory according to claim 9, wherein said refractory contains 0.05-0.15% by weight of boron oxide.

19. The slaking-resistant calcia refractory according to claim 1, consisting of components (a), (b), (c) and (d).

20. The slaking-resistant calcia refractory according to claim 7, consisting of components (a), (b), (c), (d) and (e).

* * * * *